May 1, 1956　　　H. MANSEN　　　2,743,739
MULTIPORT VALVES
Filed Aug. 1, 1952　　　　　　　　　5 Sheets-Sheet 1

Inventor
Harry Mansen
Andrew F. Wintercorn
atty.

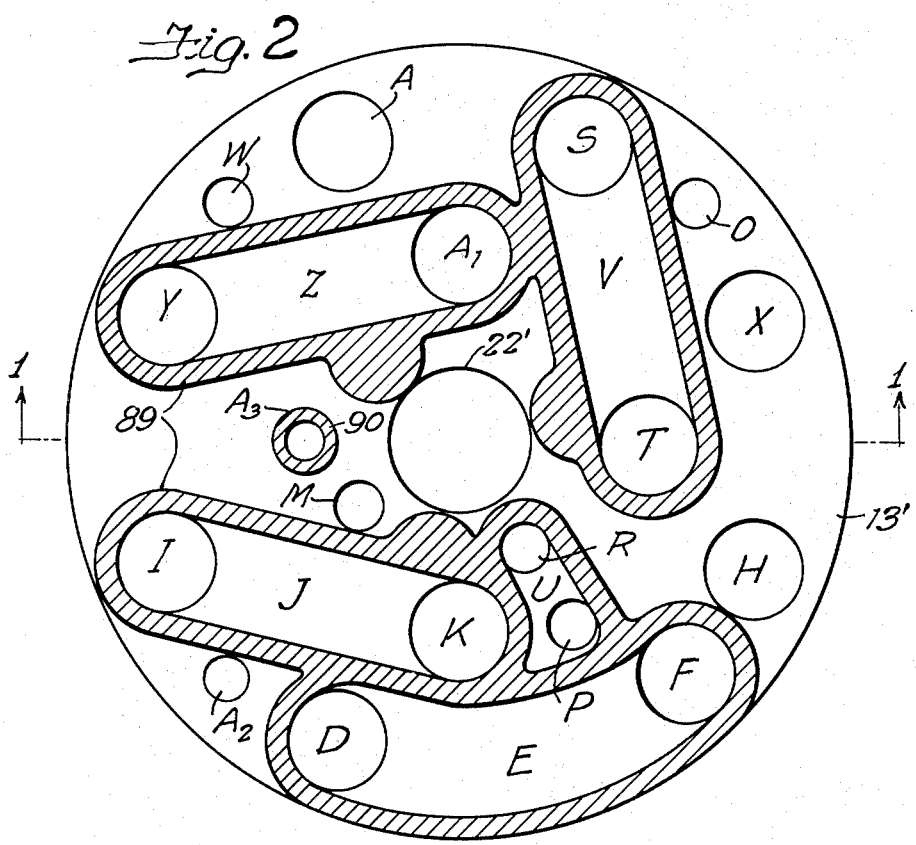

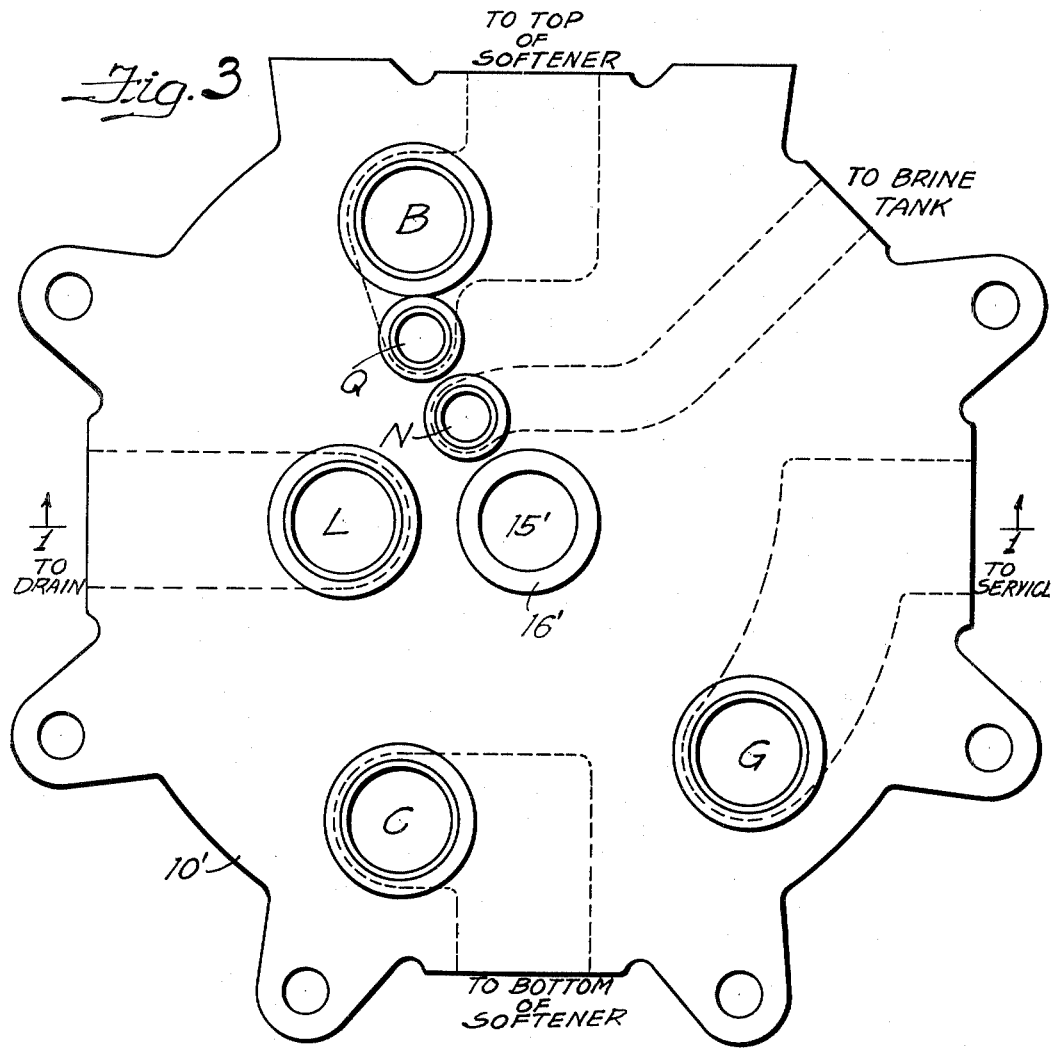

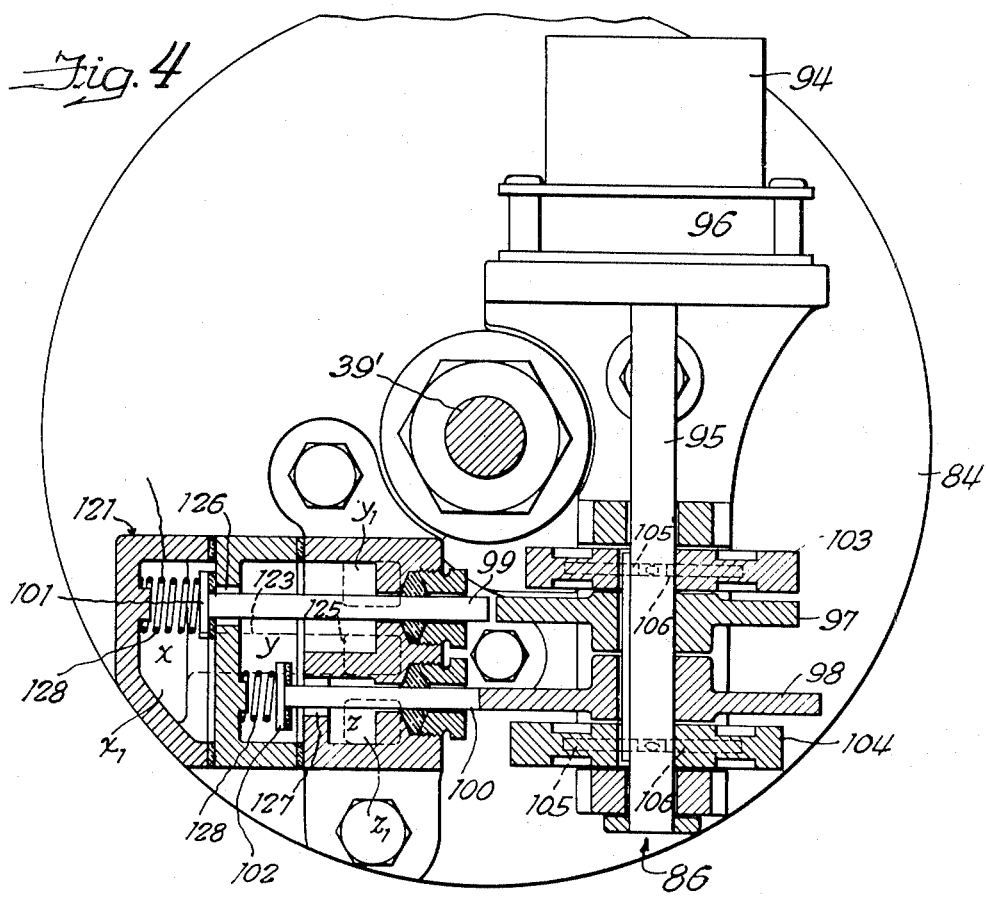

May 1, 1956 H. MANSEN 2,743,739
MULTIPORT VALVES
Filed Aug. 1, 1952 5 Sheets-Sheet 5
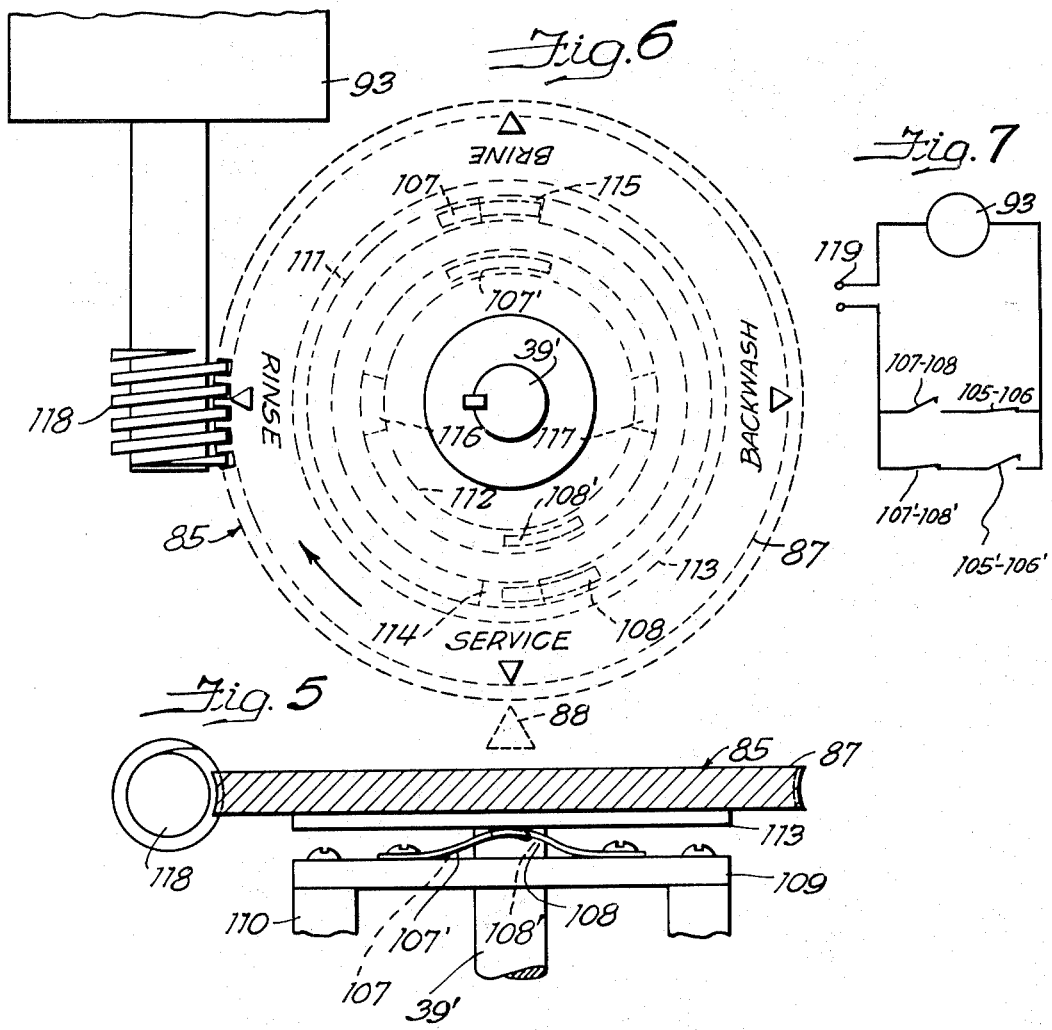
Inventor
Harry Mansen
Andrew F. Wintercorn
Atty.

United States Patent Office 2,743,739
Patented May 1, 1956

2,743,739

MULTIPORT VALVES

Harry Mansen, Chicago, Ill., assignor to Elgin Softener Corporation, Elgin, Ill., a corporation of Illinois Original application December 29, 1944, Serial No. 570,271, now Patent No. 2,644,484, dated July 7, 1953. Divided and this application August 1, 1952, Serial No. 302,064

17 Claims. (Cl. 137—627)

This application is a division of my copending application Serial No. 570,271, filed December 29, 1944, which resulted in Patent No. 2,644,484, issued July 7, 1953. This invention relates to multiport valves of the type used for controlling the flow of water and brine through a zeolite softener in the phases of softening, backwashing, brining, and rinsing.

In multiport valves, the shifting of the stem plate from one position to another results in a violent water-hammer unless the flow of incoming water is shut off, and furthermore, unless provision is made for relief of hydraulic pressure from the stem plate preliminary to the shifting thereof, the operation is, of course, rendered more difficult. A shut-off valve and a pressure relief valve have accordingly been provided in certain multiport valves.

In the multiport valve of my invention, I provide a pressure fluid operable diaphragm mechanism, preferably inside the cover of the multiport valve, which is adapted to be actuated by admission of pressure thereto to close the shut-off valve and open the relief valve whenever it is desired to shift the stem plate from one position to another. The diaphragm subjected to water pressure from the supply line is substantially larger in diameter than the shut-off valve, so that the shut-off valve is movable to closed position against the pressure of the incoming water to close the pressure port.

One of the principal objects of my invention is to provide a multiport valve of the kind mentioned, in which the relief valve while arranged to open downwardly in the closing of the shut-off valve for relief of hydraulic pressure from the stem plate seats upwardly partly under spring pressure and partly under hydraulic pressure, thus reducing likelihood of leakage of water to the drain.

Another important object of my invention is to provide a multiport valve of the kind mentioned, movable through 90° from each operative position to the next, and an automatic operating mechanism for shifting the stem plate from one position to another and admitting pressure fluid to the diaphragm mechanism and relieving such pressure in proper timed relation to these movements of the stem plate, said automatic operating mechanism including a synchronous motor for driving the timing means forming a part of the operating mechanism so as to make and break the electrical circuit for the motor that turns the stem plate so as to allow the proper time intervals between movements of the stem plate for backwashing, brining, and rinsing. The synchronous motor is arranged to have the electrical circuit therefor broken automatically when the timing means has been turned through one complete revolution, corresponding to a complete turn of the stem plate, and this motor will be started at the end of the service run either by manual operation of a switch or automatic operation of a switch by a hardness tester, water meter, time clock, or any other suitable means such as are well known in the art.

The invention is illustrated in the accompanying drawings, in which—

Fig. 2 is a plan view of the stem plate partly in horizontal section on the line 2—2 of Fig. 1;

Fig. 3 is a plan view of the body on the line 3—3 of Fig. 1;

Fig. 4 is a plan view of the cover plate of the valve shown in Fig. 1, showing the timing means in horizontal section on the line 4—4 of Fig. 1;

Figs. 5 and 6 are two views of the upper portion of the valve broken off of Fig. 1, and Fig. 7 is an electrical wiring diagram pertinent to Figs. 1 to 6.

Similar reference numerals are applied to corresponding parts throughout the views.

Figure 1:
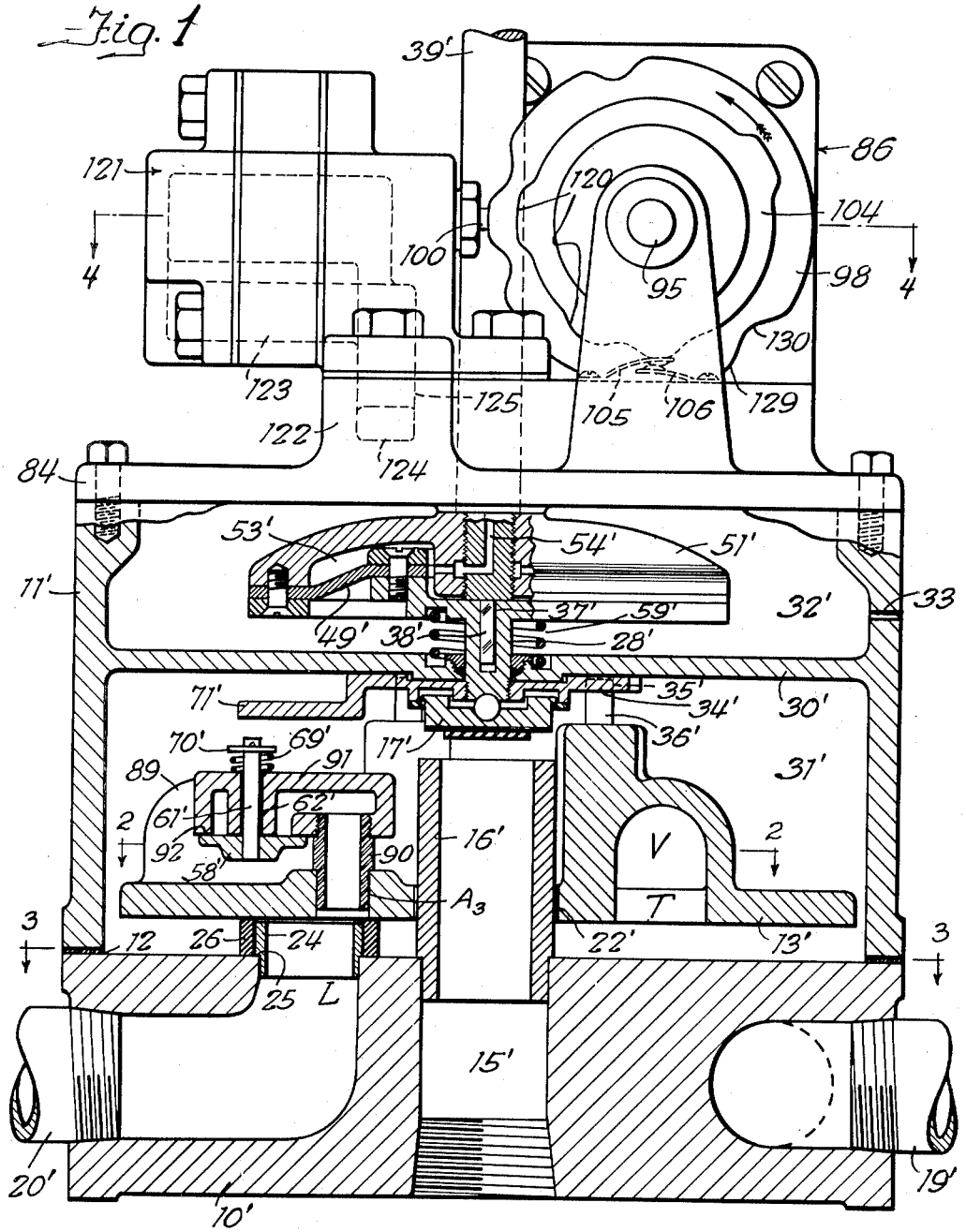
Fig. 1 is a vertical section through a multiport valve made in accordance with my invention, showing the stem plate and body in section of the lines 1—1 of Figs. 2 and 3, the upper portion of the valve being broken away to permit showing the valve on a larger scale.

Referring first to Fig. 1, the reference numeral 10' designates the stator or body member of a valve on which a cap or cover 11' is suitably secured compressing a gasket 12 therebetween to prevent leakage. The cover encloses the rotor or stem plate 13' which in its four operative positions—"service," "backwash," "brine," and "rinse"—controls the flow of water through the valve by providing a different system of communication between the various ports in the body 10' in each of the four positions. The body 10' is shown in Fig. 3, and the stem plate 13' in Fig. 2. It should be understood that although the valve is one especially designed for use in controlling the flow of water to and from a zeolite water softener, the invention is not to be regarded as limited to that or any other specific application, but is applicable to valves generally.

The body 10' has a central pressure port 15' which communicates with a raw water supply pipe. A valve seat ring 16' is inserted in the port 15' and projects upwardly from the body inside the cover 11' for cooperation with a shut-off valve 17'. A partition wall 30' is provided in the cover separating the water pressure chamber 31' from an atmospheric chamber 32' in which the pressure fluid operable means 49' for reciprocating the stem 28' for operation of the shut-off valve 17' and pressure relief valve 58' is provided. A top closure plate 84 is suitably secured on top of the cover 11', closing the atmospheric chamber 32' which is left open to the atmosphere through one or more air vents 33 provided in the upper side wall of the cover. The plate 84, as will soon appear, serves as a base plate or support for the automatic valve operating means, indicated generally by the reference numeral 85 shown in Figs. 5 and 6, and the automatic timing mechanism, indicated generally by the reference numeral 86 shown in Figs. 1 and 4.

The ports in the body 10' have rings 24 pressed therein and projecting upwardly from the body a uniform height determined by annular shoulders 25 on the outside thereof engaging the top face of the body. These rings have rubber seal rings 26 surrounding the same and seated on the flat top face of the body with their upper ends projecting slightly beyond the ends of the rings 24 for sealing contact with the flat bottom face of the stem plate 13'. The rings 26, therefore, perform the sealing function, while the rings 24 serve positively to limit compression of the rings 26, thus preventing damage thereto. With this arrangement there is no necessity for lifting the stem plate before it is turned from one position to another. The fact that the hydraulic pressure on the stem plate is relieved preliminary to the turning of the stem plate, as will soon appear, greatly reduces the drag which there would otherwise be of the stem plate on the gasket rings 26, and the stem plate can therefore be turned with less effort and with less likelihood of damage to these rings.

The shut-off valve 17', in accordance with my invention, is mounted on the end of a stem 28' that extends through a stuffing box provided in the center of wall 30' which separates the water pressure chamber 31' in the cover 11 from atmospheric chamber 32' in the upper portion of the cover. A plate 34' suitably secured on the lower end of the stem 28 has the shut-off valve 17' rotatably and universally tiltably mounted thereon so as to permit the shut-off valve to adjust itself in relation to the stem 28' and plate 34' for uniform engagement on the seat ring 16'. The plate 34', furthermore, has circumferentially spaced holes 35' therein which receive with a free sliding fit pins 36' projecting upwardly from bosses provided on the stem plate. These pins 36' are in parallel relation to one another and fit freely in the holes 35' to maintain a sliding operating connection between the plate 34' and the stem plate 13' in all positions of up and down adjustment of the stem 28'. The stem 28' has a square center hole 37' receiving with a close working fit the square lower end portion 38' of the operating stem 39'.

A pressure plate is formed integral with the upper end of the stem 28' and is clamped to the inner marginal portion of a flexible diaphragm 49', the outer marginal portion of the diaphragm being similarly clamped to a back plate 51' that is fixed to the stem 39'. Water under pressure from the same supply pipe that extends to the pressure port 15' may be admitted to the diaphragm chamber 53' through a passage 54' provided in the stem 39' which communicates at its upper end with a pipe that is arranged to be placed in communication through a three-way valve with a pipe connected to the supply pipe, or opened through said three-way valve to the atmosphere. While I prefer to utilize water under pressure from the supply source, I may more conveniently, in some installations, utilize compressed air, or some other fluid under pressure. Assuming water under pressure from the supply source is supplied through the pipe and the three-way valve is turned to a position establishing communication between the pipe and the diaphragm chamber 53', the stem 28' is immediately forced downwardly under hydraulic pressure to seat the shut-off valve 17' and unseat the pressure relief valve 58', so that the stem plate 13' can be turned easily. The stem 39' serves to transmit rotation to the stem 28' through the slidable driving connection indicated at 37'—38', so that there is no load imposed upon the diaphragm 49'. After the stem plate 13' has been shifted to the desired position, the three-way valve is turned to disconnect the diaphragm chamber 53' from the pressure source and open the diaphragm chamber to the atmosphere, whereupon a coiled compression spring 59', compressed between the pressure plate 48' and wall 30', serves to return the pressure plate 48' to the fully retracted position shown, thus opening the shut-off valve 17' and allowing the relief valve 58' to close. The diaphragm 49' is of sufficient diameter in relation to the smaller diameter of the shut-off valve 17 to insure prompt closing of the shut-off valve when water under pressure from the supply source is delivered to the diaphragm chamber 53', but when the diaphragm chamber is opened to the atmosphere the shut-off valve 17' will be caused to open promptly under hydraulic pressure just as it would if there were no spring 59'. The purpose of the spring 59' is merely to insure more prompt and complete backing up of the shut-off valve and to insure its staying fully retracted so as to avoid any likelihood of restriction to flow of water through the port 15'.

As appears in Fig. 6, the valve, which normally has its stem plate 13' in the "service" position, is arranged to be turned through 90° for each of three other positions, indicated on top of the worm gear 87 as "backwash," "brine," and "rinse." A suitable index mark will be provided on a stationary part of the valve, as indicated in dotted lines at 88 in Fig. 6, so that the operator can determine at a glance in what position the valve is set at any given time. The stem plate 13' is shown in the service position in Fig. 2 in relation to the plan view of the body 10' shown in Fig. 3. In this position, raw water under pressure from the center port 15' flows through the registering ports A and B to the top of the softener for passage downwardly through the bed of water softening material for softening. The softened water leaving the bottom of the tank is conducted through registering ports C and D, passageway E, and registering ports F and G to the service system. When the bed of water softening material requires regeneration, the stem plate is turned in a clockwise direction through 90° from service position to backwash position, whereupon the port H registers with port C to conduct raw water under pressure to the bottom of the softener for passage upwardly through the bed to break it up and clean out sediment deposited on the top of the bed during the softening operation. The waste water leaving the top of the tank is conducted through registering ports B and I, passage J, and registering ports K and L to the drain. During this backwash operation, two additional connections are established, one through registering ports M and N to the brine tank, and the other through registering ports O and G to the service system. Of course, these two connections may, and often will, be omitted, the first mentioned connection being used for filling the brine tank in certain installations, and the other connection being to by-pass raw water to the service system where such supply is desired. The backwash operation is continued for a short time, or until the water discharged to the drain runs clear. The stem plate is then turned through another 90° in a clockwise direction to brine position. In this position, port P registers with port Q, and port R with N, and S with C, and T with L, thereby establishing a main flow from the brine tank through ports N and R, passageway U, and ports P and Q to the top of the softener for passage of brine through the bed of water softening material for regeneration thereof. The spent brine leaving the bottom of the softener is conducted to the drain through registering ports C and S, passage V, and registering ports T and L. If by-pass of hard water to the service system is desired during brining, it is taken care of through registering ports W and G. After a predetermined amount of brine has been passed through the bed of water softening material sufficient for regeneration thereof, the stem plate is turned in a clockwise direction through 90° from the brine position to rinse position. In this position, the main flow is through communicating ports X and B to the top of the softener for passage of the rinse water downwardly through the bed, the waste water leaving the bottom of the softener tank being conducted to the drain through communicating ports C and Y, and passage Z, and communicating ports $A_1$ and L. Where by-pass of hard water to the service system during the rinse operation is desired, this is obtained by registration of a port $A_2$ with the port G. The stem plate is left in the rinse position for a short time, or until the water being discharged tests soft, whereupon the stem plate is turned in a clockwise direction through 90° from rinse position to service position, thus completing the cycle.

Between the hollow bosses 89, in which the passages J and Z are provided, the stem plate 13' has a port $A_3$ which registers with the drain port L when the stem plate is in service position. A smooth-ended nipple 90 is entered with a press fit in the port $A_3$ for support of a hollow fitting 91 above and in spaced relation to the stem plate between the bosses 89. This fitting carries the pressure relief valve 58' with the stem 61' slidable freely in a guide 62' and projecting from the top of the fitting 91 for engagement by the finger 71' provided on the plate 34', on which the shut-off valve 17' is carried. The pressure relief valve 58' is normally urged upwardly toward closed position partly by water pressure and partly by the action of a coiled compression spring 69' which is caged under the washer 70' on the upper end portion of the stem 61'. A flat seat 92 is provided on the bottom of the fitting 91 for the pressure relief valve. The fact that the valve is held seated under water pressure, instead of having the water pressure tending to unseat it, is important from the standpoint of avoiding leakage of water to the drain during the normal softening operation.

In passing, it will be observed that the shut-off valve 17' is arranged to seat on a valve seat bushing 16' inserted in the central port 15' and projecting freely through a center hole 22' in the stem plate 13'. The pressure fluid operable diaphragm 49' is connected with the stem 28' to seat the shut-off valve 17' under pressure when water, air, or other fluid under pressure is admitted to the diaphragm chamber 53'. The stem 28' is adapted to transmit rotation to the stem plate through pins 36' which are entered slidably in holes 35' provided therefor in the plate 34', and the stem 39' has a driving connection with the stem 28' through the medium of a square shank portion 38' slidably received in a square hole 37' provided in the stem 28', thereby relieving the diaphragm 49' of the strain which would otherwise be imposed upon it in transmitting power from the stem 39' to the stem 28' in the turning of the stem plate 13'. A coiled compression spring 59' acting between the partition wall 30' and the stem 28' tends normally to raise the plate 34' so as to unseat the shut-off valve 17' and seat the pressure relief valve 58'. This spring is compressed when the pressure fluid is admitted to the diaphragm chamber 53' to seat the shut-off valve and unseat the pressure relief valve, but when the pressure in the diaphragm chamber 53' is subsequently relieved, the spring 59' returns the parts to the normal position illustrated in Fig. 1.

The valve shown in Fig. 1 is arranged to be operated automatically from one operative position to another, each time through 90°, and an electric motor 93 is the motive means, the electrical circuit through this motor being automatically closed when the stem plate has been left in the backwash position, for example, for a predetermined length of time, whereby to start the motor 93 to move the stem plate 13' through 90° to the brine position, the electrical circuit being automatically broken at that point for stoppage of the motor 93. A synchronous motor 94 is the timer, and assuming the complete cycle for a regeneration, in which the valve is moved from service to backwash position and left in that position for a predetermined length of time, and then moved to brine position and left there for a longer period of time, and then moved to rinse position and left there a predetermined length of time, and finally is turned to service position, consumes about one hour, the motor 94, once it is started for the cycle, will run that long. The starting of this motor 94 may be accomplished by the closing of a switch manually or automatically by a hardness tester, a water meter, a time clock, or any other suitable means well known in the water softener art. As will soon appear, with the present construction the motor 94 stops automatically when the shaft 95, that is driven from the motor 94 through a suitable reduction gearing provided in the casing 96, has made one complete revolution. The shaft 95 operates the timing mechanism 86 comprising cams 97 and 98 for operating the stems 99 and 100 of two poppet valves 101 and 102 respectively, and two other cams 103 and 104 for operating two pairs of make-and-break electrical contact springs, one of which pairs appears in dotted lines at 105—106 in Fig. 1. The contacts 105—106, in closing, close electrical circuits through the motor 93 to start the same at the correct times in the cycle. There are pairs of contacts like the pair 107—108, shown in Fig. 5, mounted on a disk 109 that is stationarily mounted on suitable supports 110 below worm gear 87. These two pairs of contacts have wiping contact with concentric rings 111 and 112 of electrical conducting material mounted in a disk 113 of insulating material. The ring 111 has segments 114 and 115 in diametrically opposed relation that are of electrically non-conducting material. In like manner, the ring 112 has diametrically opposed segments 116 and 117 of non-conducting material. Thus, referring to wiring diagram Fig. 7, the motor 93 for turning the stem plate by means of the worm 118 meshing with the worm gear 87, may have an electrical circuit completed therethrough from the electrical power source 119 through either of two branches, each of which always has one switch closed preparatory to the completion of a circuit upon the closing of the other switch in that branch. Thus the switch 107—108, corresponding to contacts 107 and 108, is shown open, but the other corresponding switch 107'—108' in the other branch is closed, because the one set of contacts 107 and 108 cooperate with the ring 111 and are open-circuited by the segments 114 and 115 when the valve is in either the service position or the brine position, whereas the other set of contacts 107' and 108' are open-circuited only at the positions intermediate those just named, namely, the backwash and rinse positions. In like manner, it will be noted that the switch 105—106 in the one branch is shown closed, the same corresponding to the contacts 105 and 106 cooperating with cam 104. The other set of contacts are 105' and 106' cooperating with cam 103, and are open, as indicated by the switch 105'—106' in the other branch. In operation, therefore, the motor 93, having stopped in the service position with the switch 107—108 open, will be thrown into operation in the commencement of the regeneration cycle when the switch 105'—106' is closed at an early interval in the turning of the cam 103 with the shaft 95, and, of course, when the stem plate has been moved through 90°, the switch 107'—108' automatically opens. In the meantime, switch 107—108 has been closed and switch 105—106 has been opened and the parts are, therefore, in a position preparatory to the commencement of the operation of the motor 93 at the end of the backwash, at which time contacts 105 and 106 are again closed by cam 104. The cams 103 and 104 have knobs like that indicated at 120 in Fig. 1 in the proper angularly spaced relation to close and open the contacts 105—106 and 105'—106' in the proper timed relationship, allowing a predetermined time interval for the backwash, a greater time interval for the brining, and another time interval for the rinse. In that way, the present valve may be left unattended once the operator has commenced the regeneraion of the softener, say by closing a manually operable switch to start the synchronous motor 94. The circuit for the motor 94 is broken automatically when the stem plate returns to the service position at the end of the regeneration cycle, so that there is nothing left for the operator to do after the regeneration cycle has been commenced. Now, of course, the regeneration cycle may be commenced automatically, as stated before, by the automatic closing of a switch for the motor 94 by a hardness tester, water meter, time clock, or any other suitable means well known in the water softener art. Preliminary to the turning of the stem plate 13', pressure is admitted to the diaphragm chamber 53', and after each 90° movement of the stem plate the pressure in the diaphragm chamber 53' is relieved by the operation of the valves 101 and 102 by means of the cams 97 and 98 in proper timed relation to the closing and opening of the contacts 105—106 and 105'—106' by the cams 104 and 103 respectively. The valves 101 and 102 are provided in the pilot valve 121, the body of which is made up of three sections suitably bolted together in water-tight relationship to provide three chambers $x$, $y$ and $z$. The chamber $x$ has a bottom opening $x_1$ the chamber $y$ a bottom opening $y_1$, and chamber $z$ a bottom opening $z_1$. The openings $y_1$ and $z_2$ lead directly down into separate channels in the boss 122 that is cast integral with the plate 84, but the opening $x_1$ is connected with a third channel in the boss 122 through a passage 123, indicated in Fig. 1, provided in the bottom portion of the pilot valve body. The channels in the boss 122 are indicated in dotted lines at 124 in Fig. 1 and connecting passages at 125 leading upwardly from the channels 124 for communication with the respective bottom openings $x_1$, $y_1$, and $z_1$. Through this system of ports, channels, and passages, and also continuations thereof in the plate 84, the chamber $x$ is connected to a source of pressure supply, as for example, the water supply port 15' in the body 10' of the valve, while chamber $z$ is connected to the drain pipe 20', and chamber $y$ with the diaphragm chamber 53' through the passage 54' in the stem 39'. The valve 101 controls communication between chambers $x$ and $y$ through the port 126, and the valve 102 controls communication between chambers $y$ and $z$ through the port 127, the both valves being normally held closed under the action of springs 128. It follows, therefore, that the diaphragm chamber 53' is at atmospheric pressure when the valve 102 is opened but valve 101 is closed, as illustrated in Fig. 4. However, when valve 102 is closed and valve 101 is opened, the diaphragm chamber 53' is under pressure from the pressure source. The stems 99 and 100 for the valves 101 and 102 are, of course, operated in proper timed relation by the cams 97 and 98, hills 129 and valleys 130 being provided on the periphery of these cams, as clearly illustrated in Fig. 1, to open and close the valves at the proper intervals in relation to the movements of the stem plate.

It is believed the foregoing description conveys a good understanding of the objects and advantages of my invention. The appended claims have been drawn to cover all legitimate modifications and adaptations.

I claim:

1. In a plate type valve comprising a ported body member, a ported stem plate adapted to effect different communications between the ports in the body member in different positions of the plate, and a cover member on the body member enclosing the plate, one of said members having a pressure port normally communicating with the inside of the cover member, whereby said stem plate is normally held seated under pressure, one of the ports in the body member being a low pressure drain port, said stem plate having a port provided therein communicating with said last named port, a pressure relief valve comprising an inverted generally L-shaped fitting entered in said last named stem plate port and having a relief valve member seating upwardly to cover a port in the bottom of the cross-portion thereof, said relief valve member having a stem extending through the cross-portion of said fitting, and spring means cooperating with the projecting upper end portion of said stem normally to hold the relief valve member seated, and means for turning the plate from one position to another including a part movable downwardly with respect to said plate to operate the relief valve stem to unseat the relief valve member against the action of said spring means and against pressure inside the cover member for relief of pressure on said plate prior to movement thereof.

2. In a plate type valve comprising a ported body member, a ported stem plate adapted to effect different communication between the ports in the body member in different positions of the plate, and a cover member on the body member enclosing the plate, one of said members having a pressure port normally communicating with the inside of the cover member, whereby said stem plate is normally held seated under pressure, one of said members having a low pressure drain port, an upwardly seating spring closed pressure relief valve for said drain port completely exposed at its inlet side to the pressure in said cover member and arranged to be opened against both spring pressure and pressure in said cover member by movement downwardly with respect to said stem plate, and means for turning the stem plate from one position to another including a part movable downwardly with respect to the stem plate to open said relief valve so as to permit movement of the stem plate free of pressure.

3. In a plate type valve comprising a ported body member, a ported stem plate adapted to effect different communication between the ports in the body member in different positions of the plate, and a cover member on the body member enclosing the plate, one of said members having a pressure port normally communicating with the inside of the cover member, whereby said stem plate is normally held seated under pressure, a shut-off valve arranged to close said pressure port, one of the ports in the body member being a low pressure drain port, said stem plate having a port provided therein communicating with said last named port, a pressure relief valve comprising an inverted generally L-shaped fitting entered in said last named stem plate port and having a relief valve member seating upwardly to cover a port in the bottom of the cross-portion thereof, said relief valve member having a stem extending through the cross-portion of said fitting, and spring means cooperating with the projecting upper end portion of said stem normally to hold the relief valve seated, a shut-off valve for said pressure port movable downwardly with respect to the stem plate to closed position, and means for turning the plate from one position to another including a part movable downwardly with respect to said plate to operate the relief valve stem to unseat the relief valve member against the action of said spring means and against pressure inside the cover member for relief of pressure on said plate prior to movement thereof, said means being arranged in the same movement to close the shut-off valve.

4. In a plate type valve comprising a ported body member, a ported stem plate adapted to effect different communication between the ports in the body member in different positions of the plate, and a cover member on the body member enclosing the plate, one of said members having a pressure port normally communicating with the inside of the cover member, whereby said stem plate is normally held seated under pressure, and one of said members having a low pressure drain port, an upwardly seating spring closed pressure relief valve for said drain port completely exposed at its inlet side to the pressure in said cover member and arranged to be opened against both spring pressure and pressure in said cover member by movement downwardly with respect to said stem plate, a shut-off valve for said pressure port movable downwardly with respect to the stem plate to closed position, and means for turning the stem plate from one position to another including a part movable downwardly with respect to the stem plate to close the shut-off valve and open said relief valve so as to permit movement of the stem plate free of pressure.

5. In a plate type valve comprising a ported body member, a ported stem plate adapted to effect different communication between the ports in the body member in different positions of rotation of the plate, and a cover member on the body member enclosing said plate, one of said members having a pressure port normally communicating with the inside of the cover member whereby said plate is normally held seated under hydraulic pressure, and one of said members having a low pressure drain port, valve means for closing the pressure port and opening the drain port to permit easy turning of the stem plate free of pressure, pressure fluid operable means for operating the last mentioned valve means, valve means connected with a source of pressure fluid supply and with a pressure fluid drain for controlling communication of said pressure fluid operable means with the source of pressure fluid supply and also release of such pressure from the pressure fluid operable means to the drain, electrical motor means for turning said stem plate from one position to another, make and break contact means controlling connection of said motor means with a source of electric current supply, and timing means for operating in timed relation the contact means and the valve means controlling the pressure fluid operable means.

6. A structure as set forth in claim 5, including a synchronous electric motor for continuously operating said timing means through a cycle in which the stem plate is given a plurality of movements from one operative position to another.

7. A structure as set forth in claim 5, including a synchronous electric motor for continuously operating said timing means through a cycle in which the stem plate is given a plurality of movements from one operative position to another, said timing means comprising profiled cams having hills and valleys in a predetermined angularly spaced relationship for predetermining the time relationship between the release of pressure in the cover member and the movement of the stem plate and also the length of the time intervals between movements of said stem plate.

8. In a plate type valve comprising a ported body member, a ported stem plate adapted to effect different communication between the ports in the body member in different positions of rotation of the plate, and a cover member on the body member enclosing said plate, one of said members having a pressure port normally communicating with the inside of the cover member whereby said plate is normally held seated under hydraulic pressure, valve means for closing the pressure port, pressure fluid operable means for operating the last mentioned valve means, valve means connected with a source of pressure fluid supply and with a pressure fluid drain for controlling communication of said pressure fluid operable means with the source of pressure fluid supply and also release of such pressure from the pressure fluid operable means to the drain, electrical motor means for turning said stem plate from one position to another, make and break contact means controlling connection of said motor means with a source of electric current supply, and timing means for operating in timed relation the contact means and the valve means controlling the pressure fluid operable means.

9. A structure as set forth in claim 8, including a synchronous electric motor for continuously operating said timing means through a cycle in which the stem plate is given a plurality of movements from one operative position to another.

10. A structure as set forth in claim 8, including a synchronous electric motor for continuously operating said timing means through a cycle in which the stem plate is given a plurality of movements from one operative position to another, said timing means comprising profiled cams having hills and valleys in a predetermined angularly spaced relationship for predetermining the time relationship between the release of pressure in the cover member and the movement of the stem plate and also the length of the time intervals between movements of said stem plate.

11. In a plate type valve comprising a ported body member, a ported stem plate adapted to effect different communication between the ports in the body member in different positions of rotation of the plate, and a cover member on the body member enclosing said plate, one of said members having a pressure port normally communicating with the inside of the cover member whereby said plate is normally held seated under hydraulic pressure, and one of said members having a low pressure drain port, valve means for opening the drain port whereby to permit easy turning of the stem plate free of pressure, pressure fluid operable means for operating the last mentioned valve means, valve means connected with a source of pressure fluid supply and with a pressure fluid drain for controlling communication of said pressure fluid operable means with the source of pressure fluid supply and also release of such pressure from the pressure fluid operable means to the drain, electrical motor means for turning said stem plate from one position to another, make and break contact means controlling connection of said motor means with a source of electric current supply, and timing means for operating in timed relation the contact means and the valve means controlling the pressure fluid operable means.

12. A structure as set forth in claim 11, including a synchronous electric motor for continuously operating said timing means through a cycle in which the stem plate is given a plurality of movements from one operative position to another.

13. A structure as set forth in claim 11, including a synchronous electric motor for continuously operating said timing means through a cycle in which the stem plate is given a plurality of movements from one operative position to another, said timing means comprising profiled cams having hills and valleys in a predetermined angularly spaced relationship for predetermining the time relationship between the release of pressure in the cover member and the movement of the stem plate and also the length of the time intervals between movements of said stem plate.

14. In a plate type valve comprising a ported body member, a ported stem plate adapted to effect different communications between the ports in the body member in different positions of the plate, and a cover member on the body member enclosing the plate, one of said members having a pressure port normally communicating with the inside of the cover member, whereby said stem plate is normally held seated under pressure, one of the ports in the body member being a low pressure drain port, said stem plate having a port provided therein communicating with said last named port, a pressure relief valve comprising an inverted generally L-shaped fitting entered in said last named stem plate port and having a relief valve member seating upwardly to cover a port in the bottom of the cross-portion thereof, said relief valve member having a stem extending through the cross-portion of said fitting, and spring means arranged normally to hold the relief valve member seated, and means for turning the plate from one position to another including a part movable downwardly with respect to said plate to operate the relief valve stem to unseat the relief valve member against the action of said spring means and against pressure inside the cover member for relief of pressure on said plate prior to movement thereof.

15. In a plate type valve comprising a ported body member, a ported stem plate adapted to effect different communications between the ports in the body member in different positions of the plate, and a cover member on the body member enclosing the plate, one of said members having a pressure port normally communicating with the inside of the cover member, whereby said stem plate is normally held seated under pressure, one of the ports in the body member being a low pressure drain port, said stem plate having a port provided therein communicating with said last named port, a pressure relief valve comprising an inverted generally L-shaped fitting entered in said last named stem plate port and having a relief valve member seating upwardly under pressure of a spring means to cover a port in the bottom of the cross-portion thereof, and means for turning the plate from one position to another including a part movable downwardly with respect to said plate to unseat the relief valve member against the action of said spring means and against pressure inside the cover member for relief of pressure on said plate prior to movement thereof.

16. In a plate type valve comprising a ported body member, a ported stem plate adapted to effect different communications between the ports in the body member in different positions of the plate, and a cover member on the body member enclosing the plate, one of said members having a pressure port normally communicating with the inside of the cover member, whereby said stem plate is normally held seated under pressure, one of the ports in the body member being a low pressure drain port, said stem plate having a port provided therein communicating with said last named port, a pressure relief valve comprising an inverted generally L-shaped fitting entered in said last named stem plate port and having a relief valve member seating upwardly to cover a port in the bottom of the cross-portion thereof, said relief valve member having a stem extending through the cross-portion of said fitting, and spring means arranged normally to hold the relief valve member seated, a shut-off valve for said pressure port movable downwardly with respect to the stem plate to closed position, and means for turning the plate from one position to another including a part movable downwardly with respect to said plate to operate the relief valve stem to unseat the relief valve member against the action of said spring means and against pressure inside the cover member for relief of pressure on said plate prior to movement thereof, said means being arranged in the same movement to close the shut-off valve.

17. In a plate type valve comprising a ported body member, a ported stem plate adapted to effect different communications between the ports in the body member in different positions of the plate, and a cover member on the body member enclosing the plate, one of said members having a pressure port normally communicating with the inside of the cover member, whereby said stem plate is normally held seated under pressure, one of the ports in the body member being a low pressure drain port, said stem plate having a port provided therein communicating with said last named port, a pressure relief valve comprising an inverted generally L-shaped fitting entered in said last named stem plate port and having a relief valve member seating upwardly under pressure of a spring means to cover a port in the bottom of the cross-portion thereof, a shut-off valve for said pressure port movable downwardly with respect to the stem plate to closed position, and means for turning the plate from one position to another including a part movable downwardly with respect to said plate to unseat the relief valve member against the action of said spring means and against pressure inside the cover member for relief of pressure on said plate prior to movement thereof, said means being arranged in the same movement to close the shut-off valve.

References Cited in the file of this patent

UNITED STATES PATENTS

| | | |
|---|---|---|
| 2,093,692 | Daniels | Sept. 21, 1937 |
| 2,235,287 | Daniels | Mar. 18, 1941 |
| 2,310,978 | McGill | Feb. 16, 1943 |
| 2,398,437 | McGill | Apr. 16, 1946 |
| 2,611,392 | Johnson | Sept. 23, 1952 |